US012579000B2

(12) United States Patent
Yuan et al.

(10) Patent No.: US 12,579,000 B2
(45) Date of Patent: Mar. 17, 2026

(54) SCHEDULING METHOD FOR A MULTI-LAYER CONVOLUTIONAL NEURAL NETWORK, ELECTRONIC DEVICE AND STORAGE MEDIUM

(71) Applicant: Beijing Youzhuju Network Technology Co., Ltd., Beijing (CN)

(72) Inventors: Hangjian Yuan, Beijing (CN); Dongming Yang, Beijing (CN); Tao Li, Beijing (CN); Yunfeng Shi, Beijing (CN); Jian Wang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/093,171

(22) Filed: Mar. 27, 2025

(65) Prior Publication Data

US 2025/0231812 A1     Jul. 17, 2025

Related U.S. Application Data

(63) Continuation of application No. PCT/CN2023/119412, filed on Sep. 18, 2023.

(30) Foreign Application Priority Data

Sep. 27, 2022     (CN) .......................... 202211188739.0

(51) Int. Cl.
*G06F 9/50*          (2006.01)
*G06F 9/48*          (2006.01)
(Continued)

(52) U.S. Cl.
CPC .......... *G06F 9/5038* (2013.01); *G06F 9/4868* (2013.01); *G06N 3/02* (2013.01);
(Continued)

(58) Field of Classification Search
CPC .... G06F 9/4868; G06F 9/5038; G06F 9/3869; G06F 9/54; G06F 9/54; G06F 17/153;
(Continued)

(56) References Cited

U.S. PATENT DOCUMENTS

2020/0065154 A1*   2/2020   Huang ................... G06N 3/045
2021/0049463 A1*   2/2021   Ruff ..................... G06F 9/30038
(Continued)

FOREIGN PATENT DOCUMENTS

CN          109740732 A       5/2019
CN          111260020 A       6/2020
(Continued)

OTHER PUBLICATIONS

Shang, Jiangwei, et al. "LACS: A high-computational-efficiency accelerator for CNNs." IEEE Access 8 (2019): 6045-6059. (Year: 2019).*

(Continued)

*Primary Examiner* — Randall K. Baldwin
(74) *Attorney, Agent, or Firm* — Astute IP Law Group

(57) ABSTRACT

A scheduling method, a scheduling apparatus, an electronic device and a storage medium are provided. The scheduling method includes: respectively performing, by a plurality of compute units, a first convolution computation on a plurality of data groups that correspond to the plurality of compute units respectively, to obtain a plurality of first computation result groups; determining a data replication-transmission mode corresponding to the plurality of first computation result groups in the plurality of compute units, according to a configuration rule of a second convolutional layer in the plurality of compute units; and copying a first intermediate data row required by the first compute unit for padding in the second convolution computation process from a first computation result group in the second compute unit and trans- (Continued)

mitting the first intermediate data row that is copied to the first compute unit based on the data replication-transmission mode.

16 Claims, 9 Drawing Sheets

(51) Int. Cl.

| | | |
|---|---|---|
| *G06N 3/02* | (2006.01) | |
| *G06N 3/04* | (2023.01) | |
| *G06N 3/042* | (2023.01) | |
| *G06N 3/045* | (2023.01) | |

(52) U.S. Cl.
CPC .............. *G06N 3/04* (2013.01); *G06N 3/042* (2023.01); *G06N 3/045* (2023.01)

(58) Field of Classification Search
CPC ....... G06F 9/4843; G06F 9/5066; G06N 3/02; G06N 3/04; G06N 3/042; G06N 3/045; G06N 3/063; G06N 3/0464; G06N 3/08; G06N 3/098
See application file for complete search history.

(56) References Cited

U.S. PATENT DOCUMENTS

| | | | | |
|---|---|---|---|---|
| 2022/0083857 A1* | 3/2022 | Li | ............................ | G06F 7/523 |
| 2023/0162008 A1* | 5/2023 | Wang | ................... | G06V 10/803 |
| | | | | 706/25 |
| 2024/0096078 A1* | 3/2024 | Wang | ..................... | G06V 10/82 |

FOREIGN PATENT DOCUMENTS

| | | | |
|---|---|---|---|
| CN | 111597029 | A | 8/2020 |
| CN | 111738424 | A | 10/2020 |
| CN | 109886400 | B | 11/2020 |
| CN | 112200300 | A | 1/2021 |
| CN | 112348160 | A | 2/2021 |
| CN | 112465110 | A | 3/2021 |
| CN | 112633470 | A | 4/2021 |
| CN | 114548354 | A | 5/2022 |
| KR | 10-2021-0029595 | A | 3/2021 |

OTHER PUBLICATIONS

Zhang, Yuhang, et al. "Efficient and robust RRAM-based convolutional weight mapping with shifted and duplicated kernel." IEEE Transactions on Computer-Aided Design of Integrated Circuits and Systems 40.2 (2020): 287-300. (Year: 2020).*
Li, Gang, et al. "Block convolution: Toward memory-efficient inference of large-scale CNNs on FPGA." IEEE Transactions on Computer-Aided Design of Integrated Circuits and Systems 41.5 (2021): 1436-1447. (Year: 2021).*
Alantali, Fatmah, et al. "SLID: Exploiting spatial locality in input data as a computational reuse method for efficient CNN." IEEE Access 9 (2021): 57179-57187. (Year: 2021).*
Anderson, Andrew, et al. "Low-memory gemm-based convolution algorithms for deep neural networks." arXiv preprint arXiv:1709.03395 (2017). (Year: 2017).*
Kristensen, Andreas Toftegaard, et al. "Lupulus: A Flexible Hardware Accelerator for Neural Networks." ICASSP 2020-2020 IEEE International Conference on Acoustics, Speech and Signal Processing (ICASSP). IEEE, 2020. (Year: 2020).*
International Search Report and Written Opinion for International Application No. PCT/CN2023/119412, mailed on Dec. 14, 2023, 16 pages.
Extended European Search Report for European Patent Application No. 23870441.5, mailed on Oct. 15, 2025, 10 pages.
Heidorn et al., "Design Space Exploration for Layer-parallel Execution of Convolutional Neural Networks on CGRAs", Proceedings of the 23th International Workshop on Software and Compilers for Embedded Systems, vol. 20, May 25, 2020, 6 pages.
Office Action received for Chinese Patent Application No. 202211188739.0, mailed on Nov. 27, 2025, 14 pages.
Stoutchinin et al., "Optimally Scheduling CNN Convolutions for Efficient Memory Access", IEEE transactions on computer-aided design of integrated circuits and systems, arXiv:1902.01492v1 [cs.NE], Feb. 4, 2019, 14 pages.
Zhang et al., "Optimizing FPGA-based Accelerator Design for Deep Convolutional Neural Networks", Proceedings of the 2015 ACM/SIGDA International Symposium on Field-Programmable Gate Arrays, vol. 15, Feb. 22, 2015, 10 pages.
Zhou et al., "Adaptive Parallel Execution of Deep Neural Networks on Heterogeneous Edge Devices", Proceedings of the 4th ACM/IEEE Symposium on Edge Computing, vol. 19, Nov. 7-9, 2019, 14 pages.

* cited by examiner respectively performing, by a plurality of compute units, a first convolution computation on a plurality of data groups that correspond to the plurality of compute units respectively, to obtain a plurality of first computation result groups, a first convolutional layer obtained through the first convolution computation including the plurality of first computation result groups, and the plurality of compute units including a first compute unit and a second compute unit

— S10 determining a data replication-transmission mode corresponding to the plurality of first computation result groups in the plurality of compute units, according to a configuration rule of a second convolutional layer in the plurality of compute units, the second convolutional layer being obtained after performing, by the plurality of compute units, a second convolution computation on the first convolutional layer

— S20 copying a first intermediate data row required by the first compute unit for padding in the second convolution computation process from a first computation result group in the second compute unit and transmitting the first intermediate data row that is copied to the first compute unit based on the data replication-transmission mode,

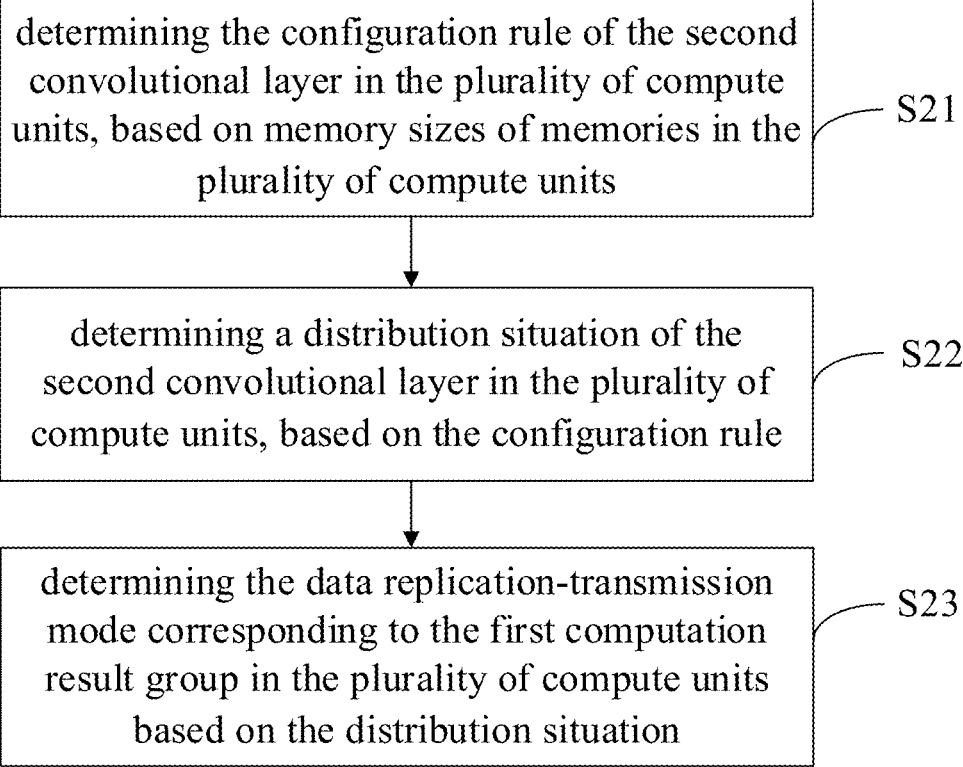

determining the configuration rule of the second convolutional layer in the plurality of compute units, based on memory sizes of memories in the plurality of compute units — S21 determining a distribution situation of the second convolutional layer in the plurality of compute units, based on the configuration rule — S22 determining the data replication-transmission mode corresponding to the first computation result group in the plurality of compute units based on the distribution situation — S23

Fig. 4 determining a size of the first intermediate data row based on a relationship between a second computation result group and a first computation result group, the second computation result group being a computation result to be obtained after the second convolution computation by the first compute unit, the first computation result group being a computation result to be obtained after the first convolution computation by the first compute unit — S31 obtaining the first intermediate data row from the first computation result group in the second compute unit, based on the data replication-transmission mode and the size of the first intermediate data row — S32

Fig. 5

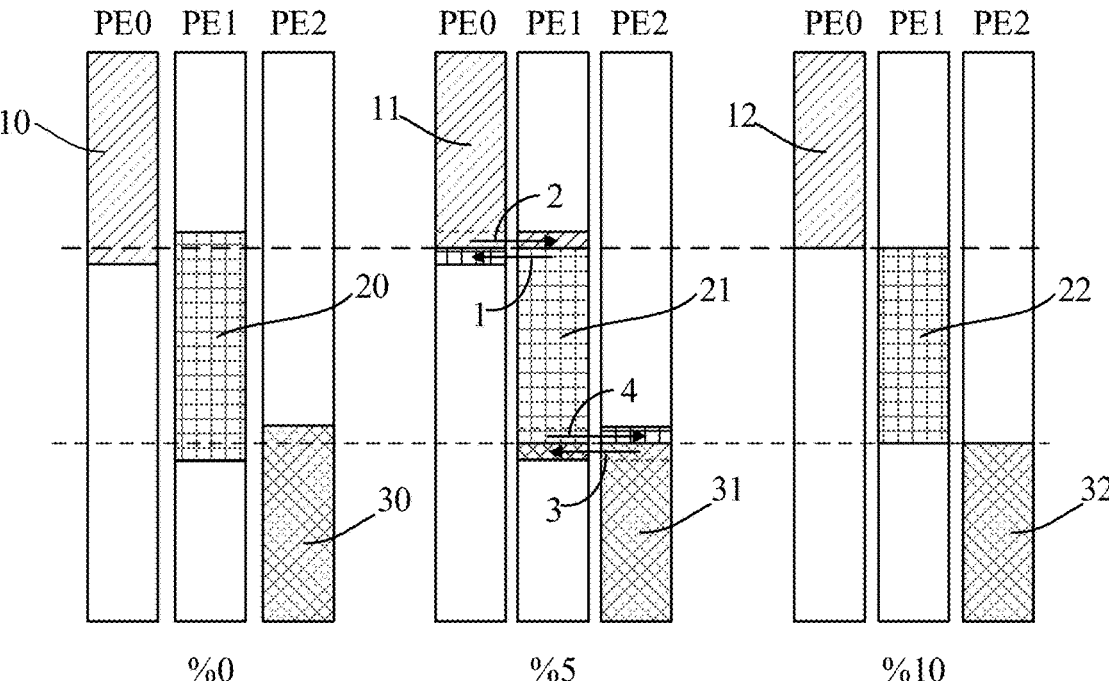

Fig. 6A

SCHEDULING METHOD FOR A MULTI-LAYER CONVOLUTIONAL NEURAL NETWORK, ELECTRONIC DEVICE AND STORAGE MEDIUM

CROSS REFERENCE TO RELATED APPLICATION(S)

The present application is a continuation of International Patent Application No. PCT/CN2023/119412, filed on Sep. 18, 2023, which claims priority to Chinese Patent Application No. 202211188739.0 filed on Sep. 27, 2022, the disclosures of which are incorporated herein by reference in their entireties as part of the present application.

TECHNICAL FIELD

Embodiments of the present disclosure relate to a scheduling method, a scheduling apparatus, an electronic device, and a storage medium.

BACKGROUND

An artificial intelligence (AI) chip is a chip dedicated to perform operations of neural network and specifically designed to accelerate the execution of the neural network. With development of artificial intelligence (AI), the number of parameters in an algorithm model increases dramatically, and the demand for computing power is growing.

Since the traditional hardware architecture (e.g., the central processing unit (CPU)) takes into account the balance between different business requirements in the architecture design stage, computing power provided thereby in AI applications is limited. Out of consideration of high computing power, the current AI chip widely adopts a domain specific ASIC (DSA) with an isomorphic multi-core architecture, in addition to a general-purpose graphics processing unit (GPU).

SUMMARY

At least one embodiment of the present disclosure provides a scheduling method for a multi-layer convolutional neural network, the scheduling method includes: respectively performing, by a plurality of compute units, a first convolution computation on a plurality of data groups that corresponds to the plurality of compute units respectively, to obtain a plurality of first computation result groups, wherein the plurality of first computation result groups are used for constituting a first convolutional layer obtained through the first convolution computation, and the plurality of compute units comprise a first compute unit and a second compute unit; determining a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer; and for the first compute unit that is required to perform effective data row padding among the plurality of compute units, obtaining a first intermediate data row required by the first compute unit for padding in the second convolution computation process from a first computation result group in the second compute unit, based on the data replication-transmission mode.

At least one embodiment of the present disclosure provides a scheduling apparatus for a multi-layer convolutional neural network, the scheduling apparatus includes: a computation control module, configured to cause a plurality of compute units to respectively perform a first convolution computation on a plurality of data groups that corresponds to the plurality of compute units respectively, to obtain a plurality of first computation result groups, wherein the plurality of first computation result groups are used for constituting a first convolutional layer obtained through the first convolution computation, and the plurality of compute units comprise a first compute unit and a second compute unit; an allocation scheduling module, configured to determine a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer; and a data transmitting module, configured to cause the first compute unit that is required to perform effective data row padding among the plurality of compute units, to obtain a first intermediate data row required by the first compute unit for padding in the second convolution computation process from a first computation result group in the second compute unit, based on the data replication-transmission mode.

At least one embodiment of the present disclosure provides an electronic device, including the scheduling apparatus according to any embodiment of the present disclosure.

At least one embodiment of the present disclosure provides an electronic device, including: a processor; and a memory, comprising at least one computer program module; wherein the at least one computer program module is stored in the memory and is configured to be executed by the processor, and the at least one computer program module is configured to implement the scheduling method according to any embodiment of the present disclosure.

At least one embodiment of the present disclosure provides a storage medium, having non-transitory computer-readable instructions stored thereon; wherein the non-transitory computer-readable instructions, when executed by a computer, implement the scheduling method according to any embodiment of the present disclosure.

BRIEF DESCRIPTION OF DRAWINGS

In order to explain the technical scheme of the embodiment of the present disclosure more clearly, the drawings of the embodiment will be briefly introduced below. Obviously, the drawings in the following description only relate to some embodiments of the present disclosure, and are not limited to the present disclosure.

FIG. 3 is a schematic flow chart of a scheduling method provided by at least one embodiment of the present disclosure;

FIG. 4 is a schematic flow chart of step S20 in FIG. 3;

FIG. 5 is a schematic flow chart of step S30 in FIG. 3;

FIG. 6A to FIG. 6D are schematic diagrams of a data replication and transmission process provided by at least one embodiment of the present disclosure;

DETAILED DESCRIPTION

Figure 1A:
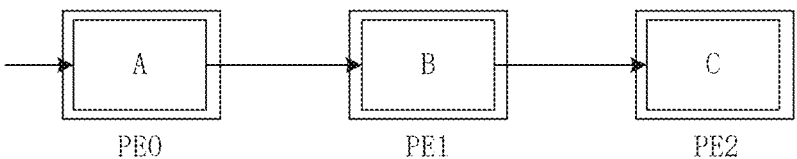
FIG. 1A is a schematic diagram of model parallel.

In order to make the purpose, technical scheme and advantages of the embodiment of the disclosure more clear, the technical scheme of the embodiment of the disclosure will be described clearly and completely with the attached drawings. Obviously, the described embodiment is a part of the embodiment of the present disclosure, not the whole embodiment. Based on the described embodiments of the present disclosure, all other embodiments obtained by ordinary people in the field without creative labor belong to the scope of protection of the present disclosure.

Unless otherwise defined, technical terms or scientific terms used in this disclosure shall have their ordinary meanings as understood by people with ordinary skills in the field to which this disclosure belongs. The terms "first", "second" and the like used in this disclosure do not indicate any order, quantity or importance, but are only used to distinguish different components. Similar words such as "include" or "comprise" mean that the elements or objects appearing before the word cover the elements or objects listed after the word and their equivalents, without excluding other elements or objects. Similar words such as "connected" or "connect" are not limited to physical or mechanical connection, but can include electrical connection, whether direct or indirect. "Up", "Down", "Left" and "Right" are only used to indicate the relative positional relationship. When the absolute position of the described object changes, the relative positional relationship may also change accordingly.

The present disclosure will be explained by several specific examples. In order to keep the following description of the embodiments of the present disclosure clear and concise, detailed descriptions of known functions and known components may be omitted. When any part of an embodiment of the present disclosure appears in more than one drawing, the part is represented by the same or similar reference numeral in each drawing.

A core idea of the domain specific ASIC (DSA) is to use special-purpose hardware to do special-purpose tasks, for example, the DSA is intended to satisfy applications within a domain, rather than a fixed application. Therefore, the DSA may obtain a compromise between flexibility and specificity. The DSA accelerator refers to the interconnection of a plurality of compute units (or referred to as processing elements (PEs) or processing cores) within a chip to implement computing power expansion and computation acceleration; the plurality of processing elements, for example, are connected with each other through communication lines; and the communication lines may be, for example, buses, on-chip networks, etc. A main challenge faced by an AI compiler is how to effectively schedule hardware resources to efficiently complete the inference of a deep neural network model for such a multi-PE interconnected AI accelerator.

At present, with respect to a multi-core compilation scheduling solution, there are two implementations as follows.

One implementation is model parallel, that is, different devices are responsible for the computation of different portions of a computational graph. For example, in some DSAs, firstly respective operators in the computational graph need to be statically allocated to different PEs inside the chip; then input data is input to a PE where a first operator is located; and after the PE where the first operator is located completes computation, the computed data is transmitted to a next PE until computation of all operators is computed. Each PE of the model parallel only executes an operator in a local memory, and each PE must wait for a previous operator to complete the computation before continuing to compute. This is a mode of serializing execution of operations in a pipeline manner.

For example, as shown in FIG. 1A, PE0, PE1 and PE2 are respectively loaded with 3 different operators; for example, the 3 operators are respectively convolution operators corresponding to different layers of a neural network. For example, PEG has convolution operator A, PE1 has convolution operator B, and PE2 has convolution operator C. During computation, a server firstly loads input data to PEG where convolution operator A is located, waits for PEG to complete a first convolution computation of the input data, transmits a result of the first convolution computation to PE1, then executes a second convolution computation corresponding to convolution operator B in PE1, and so on, until execution of convolution operator C in PE2 is completed, and returns a final result obtained in PE2 to a host.

However, the model parallel requires static compilation, and some operators in the computational graph need to be allocated to a plurality of fixed PEs, making it impossible to handle a computational graph including a dynamic shape. The dynamic shape refers to the shape of a tensor that depends on a specific operation and cannot be obtained through a computation in advance, that is, a dynamic computational graph is built according to each step of computation. Therefore, the model parallel implementation that only includes a computational graph portion cannot handle a dynamic computational graph.

Another implementation is data parallel, that is, each device has a complete computational graph. For example, in some GPUs, firstly respective operators in a computational graph need to be sequentially loaded into a GPU device; the respective operators are placed in parallel in a plurality of PEs; then, input data is split into a plurality of shares which are respectively loaded into the plurality of PEs; the plurality of PEs handle the input data in parallel until computation of all operators is completed; and computation results in the plurality of PEs are aggregated and returned to the host.

Figure 1B:
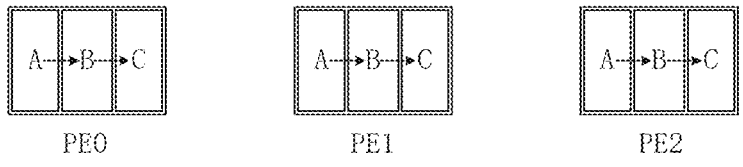
FIG. 1B is a schematic diagram of data parallel.

For example, as shown in FIG. 1B, PE0, PE1 and PE2 are each loaded with 3 different operators; for example, the 3 operators are convolution operators respectively corresponding to different layers of the neural network. For example, PE0, PE1, and PE2 each have convolution operators A, B, and C. During computation, the server firstly splits input data into a plurality of shares, for example, evenly splits the input data into three shares, and then respectively loads the 3 shares of input data into PE0, PE1 and PE2; PEG, PE1, and PE2 execute multiple convolution computations corresponding to convolution operators A, B and C on the input data in parallel until the computations are completed, and then the system aggregates final results in PE0, PE1 and PE2 and returns the same to the host.

There is currently no fixed and feasible pattern for implementing data parallel, and scheduling optimization needs to be carried out with respect to different hardware characteristics. During actual model deployment, in some models, operators have data of a large volume; while in other models, operators have data of a small volume. Therefore, different deployment solutions are required for the AI chip according to the model, so as to implement optimal inference performance.

In the current data parallel implementation, with respect to large-volume input data, the PE cannot accommodate at once all the input data required for computation, so, the input data usually needs to be split into a plurality of groups, then the plurality of groups of data are respectively placed in different PEs for parallel computation by the plurality of PEs; and after computation is completed, computation results in the plurality of PEs are aggregated to obtain a final output result corresponding to the input data.

However, in an inference computation process of a multi-layer neural network, considering a padding operation of a convolution computation, a problem of repeated computation of data may be easily incurred by directly splitting a large picture or large-volume data into a plurality of groups.

For example, an exemplary computational graph includes 3 convolution operators (conv) as follows:

%5: [(1 224 224 64), F, FP32]=conv(%0: [(1 224 224 64), F, FP32], 1%: [(64 3 3 64), W, FP32], kh=3, kw=3, pad_h_top=1, pad_h_bottom=1, pad_w_left=1, pad_w_right=1, stride h=1, stride_w=1);

%10: [(1 224 224 64), F, FP32]=conv(%5: [(1 224 224 64), F, FP32], 6%: [(64 3 3 64), W, FP32], kh=3, kw=3, pad_h_top=1, pad_h_bottom=1, pad_w_left=1, pad_w_right=1, stride h=1, stride_w=1);

%15: [(1 224 224 64), F, FP32]=conv(%10: [(1 224 224 64), F, FP32], 11%: [(64 3 3 64), W, FP32], kh=3, kw=3, pad_h_top=1, pad_h_bottom=1, pad_w_left=1, pad_w_right=1, stride_h=1, stride_w=1).

%0, %5, % 10 and %15 represent tensor data. For example, an input image for a first-layer convolution of a neural network may be represented as [B, H, W, C], that is, dimensions of input data are B×H×W×C. For example, %0 represents that a size of the input image for the first-layer convolution of the neural network is [1, 224, 224, 64], that is, the input image has 64 channels, and an image size (height H×width W) of each channel is 224×224, for a total of 1 batch. For example, a size of a convolution kernel adopted by each convolution operator conv may be represented as kh×kw, that is, kh=3, kw=3 represents that the size of the convolution kernel is 3×3. For example, a padding operation of each convolution operator conv is represented by pad; for example, pad_h_top=1 represents padding 1 row, for example, padding with 0, at the top of the picture in a height h direction of the picture; pad_h_bottom=1 represents padding 1 row, for example, padding with 0, at the bottom of the picture in the height h direction of the picture; pad_w_left=1 represents padding 1 column, for example, padding with 0, on the left side of the picture in a width w direction of the picture; pad_w_right=1 represents padding 1 column, for example, padding with 0, on the right side of the picture in the width w direction of the picture. For example, a stride size of a convolution kernel in each convolution operator conv is represented by stride, for example, stride_h=1 represents that when the convolution kernel moves in the height h direction of the picture, a size of each movement is 1 pixel point; for example, stride_w=1 represents that when the convolution kernel moves in the width w direction of the picture, a size of each movement is 1 pixel point. The computation adopts floating-point computation with a precision degree of FP32.

Figure 2:
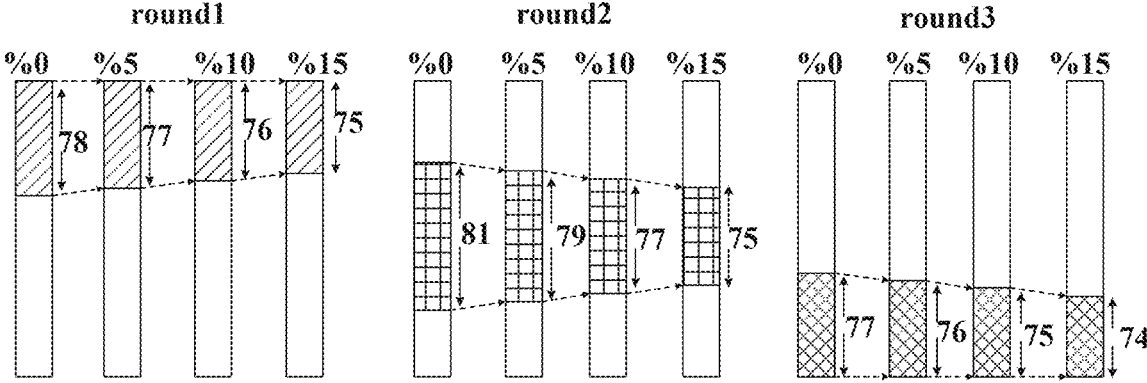
FIG. 2 is a schematic diagram of a convolution computation process based on data parallel represented on a computational graph.

For example, FIG. 2 shows a schematic diagram of a convolution computation process adopting a data parallel implementation represented on a computational graph; and the computational graph includes the 3 convolution operators as described above. For example, when a memory of one PE cannot accommodate at once all the data required for computation, the input data needs to be split into a plurality of data groups according to the memory and the number of PEs. For example, in FIG. 2, there are 3 PEs, a size of input data is 224×224; and the input data is split into 3 data groups to be respectively loaded into the 3 PEs for convolution computation.

How to split input data as well as a size, a range, etc. of a data group split needs to be selected according to output data. For example, in the computational graph shown in FIG. 2, the size of the output data %15 is 224×224; if it is selected to substantially evenly split the data into 3 shares in the height H dimension of the output data, then (height) sizes of the 3 shares of output data groups on three rounds, namely, round1, round2, and round3 respectively corresponding to the 3 PEs are respectively 75 rows, 75 rows, and 74 rows. When splitting the input data, each share of output data needs to have depth-first traversal performed through the entire data group for forward recursion to obtain a range of each share of input data.

It should be noted that the data displayed in the computational graph shown in FIG. 2 are all "effective data". For simplification, the "effective data" here represents data that is effective and has practical significance among data obtained through each convolution computation. In practical computation, in order to keep an image size unchanged after each convolution computation, padding operations are required. Therefore, with respect to data at an "edge" of each data group having been split, a region that is formed by padded "0" and is used for a convolution computation with the convolution kernel is a non-effective region; and a result obtained through the convolution computation performed on the region is non-effective data and needs to be discarded. That is, the output data obtained through the convolution computation performed on the complete input data is effective data. Therefore, corresponding to the split data group, only the data in the effective region obtained after the convolution computation is effective data. For clarity in illustration and simplicity in description, the data shown in the computational graph in the accompanying drawings of the present disclosure is all effective data.

For example, round1 of FIG. 2 shows that the output data %15 has 75 rows of effective data, namely, [0,74]. Since the padding operation is: pad_h_top=1, pad_h_bottom=1, intermediate data %10 obtained through forward recursion from %15 needs to have 76 rows of effective data, namely, [0,75]rows; intermediate data %5 obtained through forward recursion from the intermediate data %10 needs to have 77 rows of effective data, namely, [0,76]rows, and so on; the finally obtained input data %0 needs to have 78 rows of effective data. Thus, it is obtained that a range of read data in the height direction for the input data %0 of round1 is [0,77](with a row number starting from 0), a total of 78 lines.

Similarly, round2 in FIG. 2 shows that the output data %15 has 75 rows of effective data, namely, [75,149]. Since the padding operation is pad_h_top=1, pad_h_bottom=1, the intermediate data %10 obtained through forward recursion from %15 needs to have 77 rows of effective data, namely, [74,150]rows; the intermediate data %5 obtained through forward recursion from the intermediate data %10 needs to have 79 rows of effective data, namely, [73,151]rows, and so on, and the finally obtained input data %0 needs to have 81 rows of effective data. Thus, it is obtained that a range of read data in the height direction for the input data %0 of round2 is [72,152], a total of 81 rows.

Similarly, round3 of FIG. 2 shows that the output data %15 has 74 rows of effective data, namely, [150,223]. Since the padding operation is: pad_h_top=1, pad_h_bottom=1, the intermediate data %10 obtained through forward recursion from %15 needs to have 75 rows of effective data, namely, [149,223]rows; the intermediate data %5 obtained through forward recursion from the intermediate data %10 needs to have 76 rows of effective data, namely, [148,223] rows, and so on, and the finally obtained input data %0 needs to have 77 rows of effective data. Thus, is obtained that a range of read data in the height direction for the input data %0 of round3 is [147,223], a total of 77 rows.

From the computational graph in FIG. 2, it may be seen that a repeated computation region for round1 and round2 is [72,77]rows, that is, 6 rows are repeated; a repeated computation region for round2 and round3 is [147,152]rows, which also has 6 rows repeated. Thus, it may be seen that the greater the depth of the convolutional network, the more the times of forward recursion, and the more effective data required at the edge of the data group caused by padding in a previous layer, that is, the larger the region that needs to be repeatedly computed, which will result in a large amount of redundancy overhead of computing power.

At least one embodiment of the present disclosure provides a scheduling method for a multi-layer convolutional neural network. The scheduling method includes: respectively performing, by a plurality of compute units, a first convolution computation on a plurality of data groups that corresponds to the plurality of compute units respectively, to obtain a plurality of first computation result groups, wherein the plurality of first computation result groups are used for constituting a first convolutional layer obtained through the first convolution computation, and the plurality of compute units comprise a first compute unit and a second compute unit; determining a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer; and for the first compute unit that is required to perform effective data row padding among the plurality of compute units, obtaining a first intermediate data row required by the first compute unit for padding in the second convolution computation process from a first computation result group in the second compute unit, based on the data replication-transmission mode. The scheduling method may implement balanced utilization of computing power of the compute units, by replicating and transmitting effective data in one compute unit to another compute unit, which reduces repeated computation of data and improves the utilization rate of computing power.

At least one embodiment of the present disclosure further provides a scheduling apparatus, an electronic device, and a storage medium. The scheduling apparatus, the electronic device, and the storage medium may also implement balanced utilization of computing power of the compute units, by replicating and transmitting effective data in one compute unit to another compute unit, which reduces repeated computation of data and improves a utilization rate of computing power.

Hereinafter, the embodiments of the present disclosure will be illustrated in detail with reference to the accompanying drawings. It should be noted that the same reference signs in different diagrams will be used to refer to the same elements already described.

Figure 3:
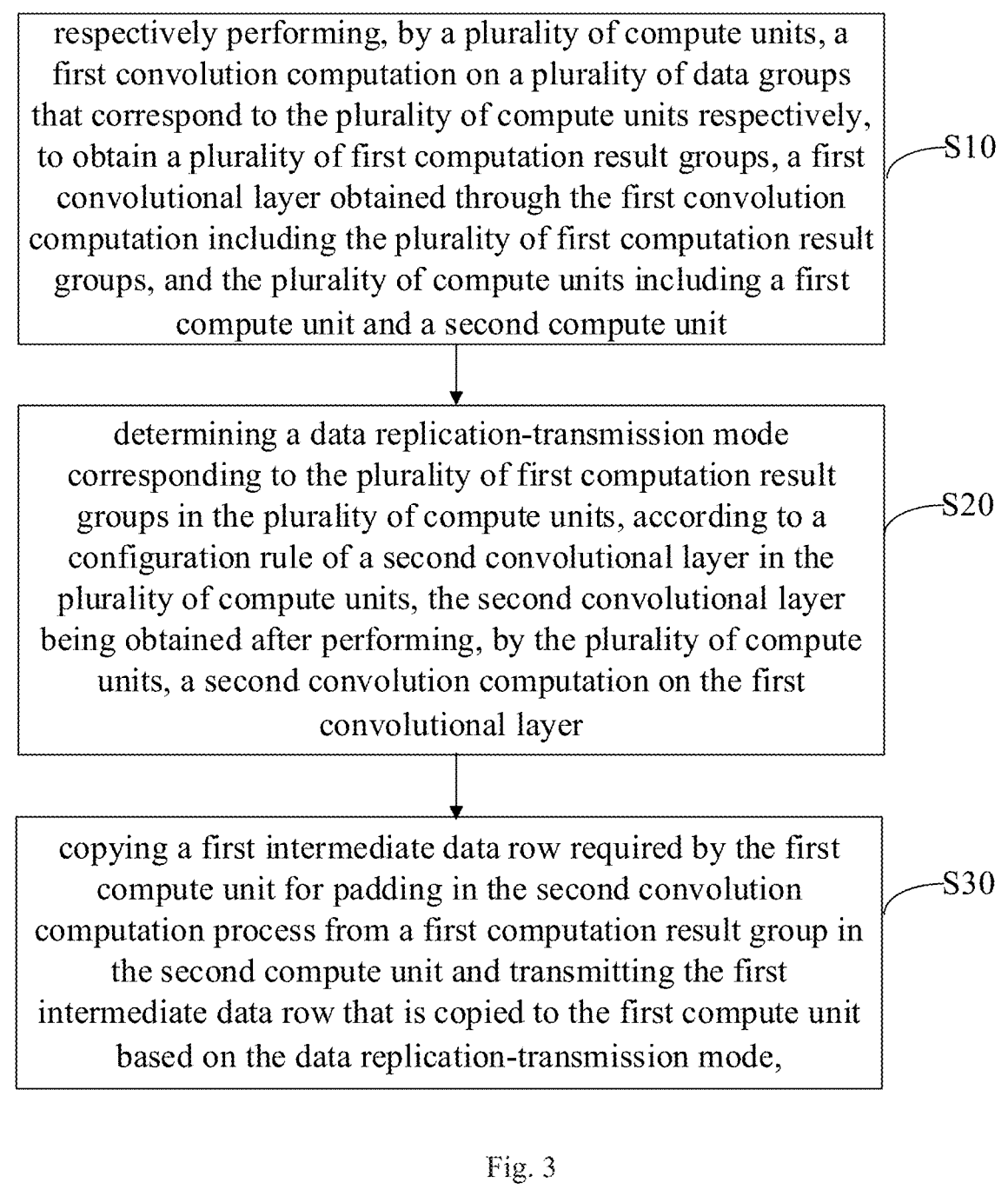

FIG. 3 is a schematic flow chart of a scheduling method provided by at least one embodiment of the present disclosure. As shown in FIG. 3, the scheduling method includes step S10 to step S30.

Step S10: respectively performing, by a plurality of compute units, a first convolution computation on a plurality of data groups that correspond to the plurality of compute units respectively, to obtain a plurality of first computation result groups, a first convolutional layer obtained through the first convolution computation including the plurality of first computation result groups, and the plurality of compute units including a first compute unit and a second compute unit;

Step S20: determining a data replication-transmission mode corresponding to the plurality of first computation result groups in the plurality of compute units, according to a configuration rule of a second convolutional layer in the plurality of compute units, the second convolutional layer being obtained after performing, by the plurality of compute units, a second convolution computation on the first convolutional layer;

Step S30: copying a first intermediate data row required by the first compute unit for padding in the second convolution computation process from a first computation result group in the second compute unit and transmitting the first intermediate data row that is copied to the first compute unit based on the data replication-transmission mode.

For example, the scheduling method may be used in a computing apparatus such as an AI chip or a general-purpose graphics processing unit (GPGPU) that performs a convolution operation on a multi-layer convolutional neural network. For example, the AI chip may be an AI chip that adopts a DSA accelerator or an AI chip having a plurality of PEs; for example, the scheduling method may be used in data parallel distributed training, which will not be limited in the embodiments of the present disclosure.

It should be noted that in at least one embodiment of the present disclosure, the "first convolution computation" may represent a convolution computation performed on a complete input image, or may also represent a convolution computation performed on a current input data group in a compute unit. The "first convolution computation" may be any convolution computation in a multi-layer convolution computation, rather than just a convolution computation for a first-layer convolution. For example, the "first convolution computation" may be a convolution computation performed on the first-layer convolution, or may also be a convolution computation performed on a second layer, a third layer, etc.

In at least one embodiment of the present disclosure, the "second convolution computation" represents a next convolution computation corresponding to the "first convolution computation", that is, the "second convolution computation" is a convolution computation performed by taking the "first convolutional layer" obtained after the first convolution computation as input. The "first convolutional layer" is a convolutional layer constituted by computation results obtained through the "first convolution computation"; and here, the "first convolutional layer" represents an actual convolutional layer obtained through the first convolution computation performed on an intact input image having not been split. For example, the first convolutional layer may be input data for the second convolution computation. Similarly, the "second convolutional layer" is a convolutional layer constituted by computation results obtained through the "second convolution computation"; and here, the "second convolutional layer" represents an actual convolutional layer obtained through the second convolution computation performed on the first convolutional layer constituted by data having not been split.

Hereinafter, the scheduling method according to the embodiment of the present disclosure will be introduced in detail with reference to the computational graph shown in FIG. 6A to FIG. 6D. In the following exemplary illustration, three PEs (FIG. 6A to FIG. 6C) are taken as an example, but the embodiments of the present disclosure are not limited thereto, and the computing apparatus may include, for example, 2 PEs, 4 PEs (FIG. 6D), or a greater number of PEs.

It should be noted that an elongated region shown in FIG. 6A to FIG. 6D is an abstract representation of a range of at least some effective data on a certain dimension (e.g., height H or width W) of the input image for each convolution computation. A diagonal line region, a grid line region, and a diamond line region are respectively abstract representations of the data groups in the compute units (PE0, PE1, PE2, etc.), and positions thereof in their respective elongated regions are only schematic representations of corresponding positions of their respective data groups on the input image, and do not constitute limitations on the embodiments of the present disclosure.

For example, in step S10, the corresponding "plurality of data groups" in the plurality of compute units may be a plurality of original input data groups (these original input data groups are input to the computing apparatus) obtained by splitting an original input matrix, or may also be a plurality of input data groups for performing any convolution computation in the computing apparatus. For example, the plurality of data groups may be the plurality of data groups 10, 20 and 30 for performing a convolution computation on %0, or may also be the plurality of data groups for performing a convolution computation on % 5, in PE0, PE1 and PE2 in FIG. 6A; for example, a data group for performing a convolution computation on %5 by each compute unit includes a first computation result group and an intermediate data row acquired from another compute unit. That is, in at least one embodiment of the present disclosure, the first computation result group in the first compute unit and the first intermediate data row obtained from the second compute unit constitute a data group the first compute unit requires for performing the second convolution computation.

For example, in step S10, the plurality of compute units respectively perform the first convolution computation on the plurality of corresponding data groups to obtain the plurality of corresponding first computation result groups. For example, the plurality of first computation result groups may be used for constituting the first convolutional layer obtained through the first convolution computation. For example, as shown in FIG. 6A, the plurality of compute units PE0, PE1, and PE2 respectively perform a first convolution computation on a plurality of corresponding data groups 10, 20, and 30, to obtain a plurality of first computation result groups 11, 21 and 31; and the plurality of first computation result groups 11, 21 and 31 may be used for constituting the first convolutional layer obtained through the first convolution computation.

For example, in the embodiment of the present disclosure, the plurality of first computation result groups in the plurality of compute units may directly constitute the first convolutional layer obtained through the first convolution computation or may constitute a portion of the first convolutional layer obtained through the first convolution computation. For example, when the input image is small, the plurality of compute units may carry all the input data at once, so the first convolutional layer may be constituted just by aggregating the plurality of first computation result groups in the plurality of compute units; when the input image is large, the plurality of compute units cannot carry all the input data at once, so the input data needs to be split to be loaded into the compute units multiple times, input data loaded into the compute unit each time is split into a plurality of groups, and the plurality of groups are respectively placed into the plurality of compute units; and therefore, the plurality of first computation result groups in the plurality of compute units only constitute a portion of the first convolutional layer that corresponds to the input data loaded this time.

For example, in step 10, the data rows in the plurality of first computation result groups are continuous without overlap in the first convolutional layer. For example, as shown in FIG. 6A, the data rows in the plurality of first computation result groups 11, 21 and 31 are continuous without overlap in the first convolutional layer, that is, the data in the plurality of first computation result groups 11, 21 and 31 obtained through the first convolution computation performed by the plurality of compute units PE0, PE1 and PE2 on %0 has no overlapping portions.

For example, in the embodiment of the present disclosure, the "data row" may represent one row of data or one column of data in the input image. For example, in the data group split in the height H dimension shown in FIG. 6A, the "data row" represents one row of data in the height direction of the input image, and of course, the "data row" may also represent one column of data in the width direction of the input image, which will not be limited in the embodiments of the present disclosure.

For example, in step S20, determining a data replication-transmission mode corresponding to the plurality of first computation result groups in the plurality of compute units, according to a configuration rule of a second convolutional layer in the plurality of compute units, and the second convolutional layer being obtained after performing, by the plurality of compute units, a second convolution computation on the first convolutional layer. It should be noted that here "the second convolution computation performed on the first convolutional layer" does not refer to an actual convolution computation in the compute unit, but rather refers to a rule in which the size of the second convolutional layer to be obtained after performing the second convolution computation may be known according to the size of the first convolutional layer based on the rule of the convolution computation, so, "the second convolutional layer" does not refer to a specific computation result of the data in the second convolutional layer that needs to be obtained. For example, a splitting mode of the second convolutional layer may be determined, that is, the configuration rule of the second convolutional layer in the plurality of compute units may be determined, according to the size of the second convolutional layer.

FIG. 4 is a schematic flow chart of step S20 in FIG. 3. For example, in some examples, as shown in FIG. 4, step S20 may further include step S21 to step S23.

Step S21: determining the configuration rule of the second convolutional layer in the plurality of compute units, based on memory sizes of memories in the plurality of compute units;

Step S22: determining a distribution situation of the second convolutional layer in the plurality of compute units, based on the configuration rule;

Step S23: determining the data replication-transmission mode corresponding to the first computation result group in the plurality of compute units based on the distribution situation.

For example, in step S21, obtaining the size of a memory in the plurality of compute units, and determining the configuration rule of the second convolutional layer in the plurality of compute units based on the memory size of each compute unit. For example, the second convolutional layer is split into a plurality of shares of data; and a size of each share of data must not exceed available capacity of the memory allocated to a compute unit corresponding thereto, which is a prerequisite for determining the configuration rule.

For example, in step S22, based on the determined configuration rule, determining how to split the second convolutional layer, that is, the distribution situation of the plurality of shares of data groups split from the second convolutional layer in the plurality of compute units is determined. For example, the distribution situation of the plurality of first computation result groups in the plurality of compute units and the determined configuration rule, the distribution situation of the plurality of shares of data groups split from the second convolutional layer in the plurality of corresponding compute units may be determined.

For example, in step S23, determining the data replication-transmission mode corresponding to the first computation result group in the plurality of compute units, based on the distribution situation of the second convolutional layer in the plurality of compute units determined according to the configuration rule. For example, the data replication-transmission mode may include a unidirectional data transmission mode and a bidirectional data transmission mode. For example, the unidirectional data transmission mode represents that the compute unit may only acquire replicated data from another unit, while the bidirectional data transmission mode represents that the compute unit may not only acquire replicated data from another compute unit, but also replicate and transmit its own data to the other compute unit. For example, the plurality of compute units may be set to have the same data replication-transmission mode (e.g., one data replication-transmission mode is provided and corresponds to the plurality of first computation result groups), or the plurality of compute units may also be set to have different data replication-transmission modes(e.g., more than one data replication-transmission modes are provided and correspond to the plurality of first computation result groups, for example, each compute unit has a corresponding data replication-transmission mode). The data replication-transmission modes are not limited to the above-described two patterns, and may also be other feasible implementations, which will not be limited in the embodiments of the present disclosure.

For example, in one example, the configuration rule may be: let the distribution of the data of the second convolutional layer in the plurality of compute units all be the same as the data range of the first computation result group in the plurality of compute units. For example, as shown in FIG. 6A, the plurality of compute units PE0, PE1, and PE2 perform the first convolution computation on the data group of %0 to obtain the first convolutional layer constituted by the plurality of first computation result groups 11, 21 and 31; and thus, the size of the second convolutional layer obtained through the second convolution computation performed on the first convolutional layer may be known through computation. Therefore, it is proposed to split the data of the second convolutional layer and allocate the same to the plurality of compute units PE0, PE1, and PE2 according to a distribution mode of the %10 as shown in FIG. 6A; and the data replication-transmission mode when each compute unit performs a convolution computation on %5 may be determined according to the configuration rule. For example, it may be determined according to the configuration rule that the data replication-transmission modes of the plurality of compute units PE0, PE1, and PE2 are all bidirectional data transmission patterns.

Figure 6B:
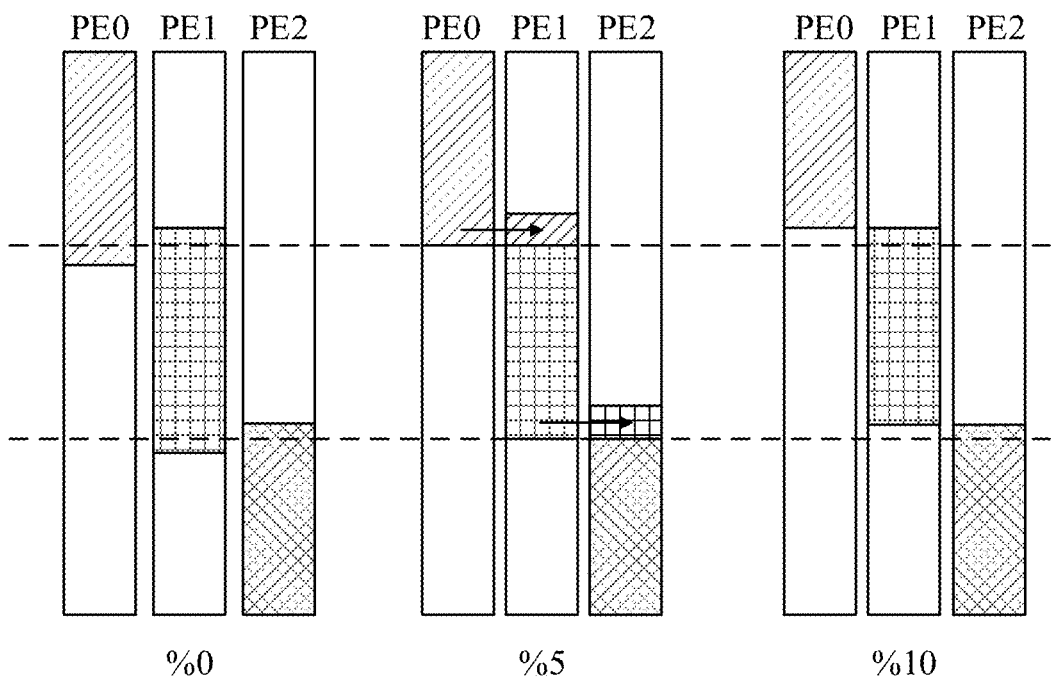
Figure 6C:
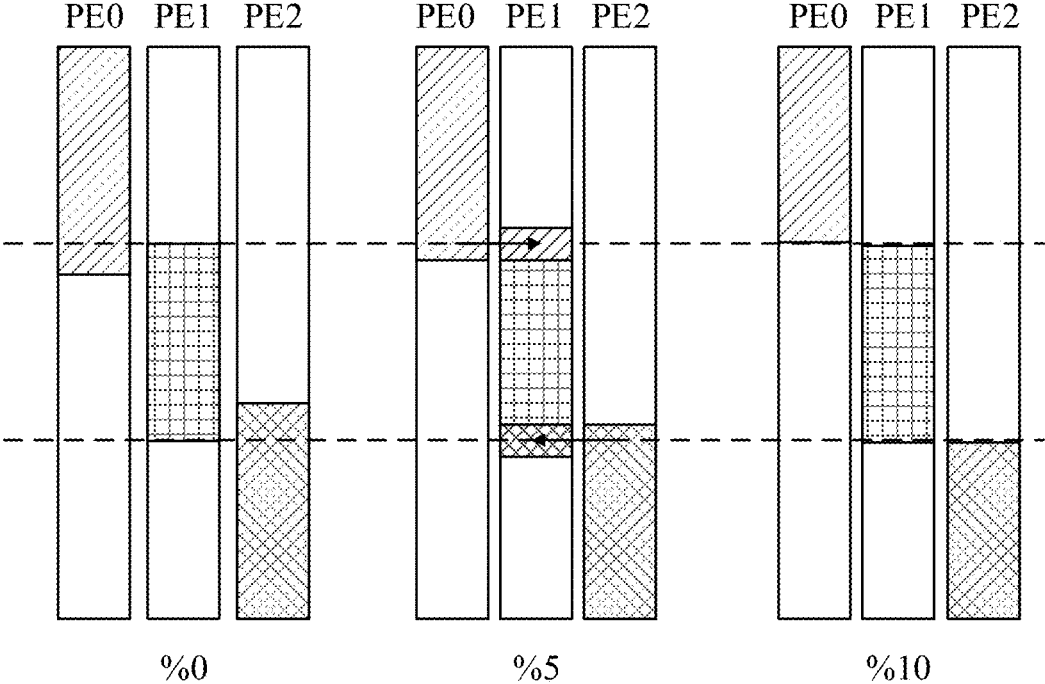

For example, in another example, the configuration rule may be: let the distribution of the data of the second convolutional layer in some compute units among the plurality of compute units be the same as the data range of the first computation result group in these compute units. For example, as shown in FIG. 6B, after obtaining the size of the second convolutional layer, it is proposed to allocate the data of the second convolutional layer to the plurality of compute units PE0, PE1 and PE2 according to the distribution mode of the %10 as shown in FIG. 6B, that is, splitting the data of the second convolutional layer into 3 shares, and the data range allocated to PE1 is equal in size to the data range of the first computation result group in PE1. Thus, a data replication-transmission mode when each compute unit performs a convolution computation on %5 may be determined according to the configuration rule, for example, it may be determined that the data replication-transmission modes of the plurality of compute units PE0, PE1, and PE2 are all unidirectional data transmission modes.

In the embodiment of the present disclosure, the configuration rule may not only be set according to the memory size of the compute unit, but also be flexibly set according to factors such as computing power allocation and data transmission overhead, etc. of the plurality of compute units; and specific contents of the configuration rule will not be limited in the embodiments of the present disclosure.

For example, in step S30, firstly the first compute unit that requires effective data row padding among the plurality of compute units is determined. For example, it may be a case where the plurality of compute units all require effective data row padding, or it may also be a case where only some compute units require effective data row padding among the plurality of compute units. For example, in FIG. 6A, PEG, PE1, and PE2 are all the first compute units that require effective data row padding; in FIG. 6B, PE1 and PE2 are the first compute units that require effective data row padding; and in FIG. 6C, only PE1 is the first compute unit that requires effective data row padding.

For example, in step S30, after determining the first compute unit that requires effective data row padding, and the data replication-transmission mode corresponding to the first compute unit, the first compute unit acquires at least one share of first intermediate row data from the first computation result group of another compute unit. For example, the first compute unit may acquire two shares of the first intermediate row data from the first computation result groups of two different compute units; and the two shares of the first intermediate row data are both what the first compute unit requires for padding in the second convolution computation process. For example, in FIG. 6A, PEG serves as the first compute unit to acquire 1 or more rows of first intermediate data row from the first computation result group 21 of PE1; PE1 serves as the first compute unit to acquire 1 or more rows of first intermediate data row from the first computation result group 11 of PEG, and acquire 1 or more rows of first intermediate data row from the first computation result group 31 of PE2; and PE2 serves as the first compute unit to acquire 1 or more rows of first intermediate data row from the first computation result group 21 of PE1.

FIG. 5 is a schematic flow chart of step S30 in FIG. 3. For example, in some examples, as shown in FIG. 5, step S30 may further include step S31 and step S32.

Step S31: determining a size of the first intermediate data row based on a relationship between a second computation result group and a first computation result group, the second computation result group being a computation result to be obtained after the second convolution computation by the first compute unit, the first computation result group being a computation result to be obtained after the first convolution computation by the first compute unit;

Step S32: obtaining the first intermediate data row from the first computation result group in the second compute unit, based on the data replication-transmission mode and the size of the first intermediate data row.

For example, in step S31, the size of the first intermediate data row obtained by the first compute unit from another compute unit is determined by the relationship between the second computation result group and the first computation result group; and the relationship between the second computation result group and the first computation result group is determined by factors such as the distribution situation of the second convolutional layer in the compute unit, the size of the convolution kernel, and the padding operation, etc.

For example, in step S32, the first intermediate data row may be obtained from the first computation result group in the second compute unit through inter-core transmission between compute units. For example, by obtaining an address of the first intermediate data row in the first computation result group of the second compute unit, the first intermediate data row is read and replicated into the first compute unit, and the replicated first intermediate data row is written to a corresponding address of the first compute unit. For example, in FIG. 6A, PE1 has [74,150]rows of effective data of %0, and storage addresses corresponding to the 77 rows of data are address_0 to address_76; then after the first convolution computation is performed, the first computation result group in PE1 is [75,149]rows in the first convolutional layer, a total of 75 rows of data, which may be respectively allocated to address_1 to address_75; the first intermediate data row acquired from the first computation result group 11 of PEG is written to the address address_0, and the first intermediate data row acquired from the first computation result group 31 of PE2 is written to the address address_76. A specific implementation of the data replication and transmission process between compute units will not be limited in the embodiments of the present disclosure.

For example, the scheduling method further includes step S40 (not shown): splitting the original input matrix to obtain the plurality of original input data groups, and respectively transmitting the plurality of original input data groups to the plurality of compute units for performing the first convolution computation.

For example, a splitting mode of the original input matrix may be determined according to the size of the first convolutional layer obtained after performing the first convolution computation on the original input matrix, the number of compute units, and the memory size, etc. For example, the splitting pattern is evenly splitting the original input matrix into the plurality of original input data groups, or correspondingly splitting the original input matrix into the plurality of original input data groups according to the memory size of the compute unit, to respectively place the same into the plurality of compute units. For example, the original input data group may serve as a data group on which the first convolution computation is performed.

For example, the scheduling method further includes step S50 (not shown): aggregating the plurality of second computation result groups in the plurality of compute units to obtain at least a portion of computation output of the multi-layer convolutional neural network, in response to the second convolutional layer being an output layer in the multi-layer convolutional neural network. For example, when the computation of the last convolution operator ends and the second convolutional layer is the last convolutional layer, the second convolutional layer is just the output result. That is, the second convolutional layer constituted by the second computation result groups in the plurality of compute units is the computation output or at least a portion of the computation output of the multi-layer convolutional neural network.

In the embodiment of the present disclosure, the plurality of compute units include at least two compute units, for example, the first compute unit and the second compute unit; and the multi-layer convolutional neural network includes at least two convolutional layers. For example, the examples shown in FIG. 6A to FIG. 6C include 3 compute units PE0, PE1, and PE2, which include two convolution operators (conv) as follows:

%5: [(1 224 224 64), F, FP32]=conv(%0: [(1 224 224 64), F, FP32], 1%: [(64 3 3 64), W, FP32], kh=3, kw=3, pad_h_top=1, pad_h_bottom=1, pad_w_left=1, pad_w_right=1, stride h=1, stride_w=1);

%10: [(1 224 224 64), F, FP32]=conv(%5: [(1 224 224 64), F, FP32], 6%: [(64 3 3 64), W, FP32], kh=3, kw=3, pad_h_top=1, pad_h_bottom=1, pad_w_left=1, pad_w_right=1, stride_h=1, stride_w=1);

For example, as shown in FIG. 6A, the chip adopts 3 compute units PE0, PE1, and PE2 to perform a data parallel convolution computation on the input data of 224×224. For example, step S40 is executed to substantially evenly split the original input matrix into 3 original input data groups 10, 20, and 30 with the height H dimension of the input data, and respectively load the same into the 3 compute units PE0, PE1 and PE2, as shown on %0. For example, the original input data group 10 includes [0,75], a total of 76 rows of data; the original input data group 20 includes [74,150], a total of 77 rows of data; and the original input data group 30 includes [149,223], a total of 75 rows of data. For example, step S10 is executed so that the plurality of compute units PE0, PE1, and PE2 respectively perform the first convolution computation on the 3 corresponding original input data groups 10, 20, and 30, to obtain the first computation result groups 11 ([0,74]rows), 21 ([75,149]rows), and 31 ([150, 223]rows) as shown on %5; and the first computation result groups constitute the first convolutional layer obtained through the first convolution computation correspondingly performed on the original input matrix.

For example, step S20 is executed so that it is determined that the 3 compute units PE0, PE1, and PE2 all have the same data replication-transmission mode, that is, the bidirectional data transmission pattern, according to the configuration rule that let distribution of the data of the second convolutional layer in the plurality of compute units all be the same as the data range of the first computation result group in the plurality of compute units. Then, step S30 is executed so that it is determined that the 3 compute units PEG, PE1, and PE2 are all compute units that require data replication and transmission, and it is determined that the number of first intermediate data rows each compute unit requires is one, and then, each compute unit acquires the first intermediate data row it requires for padding when performing the second convolution computation from another compute unit.

For example, PEG serves as the first compute unit, PE1 serves as the second compute unit, and as shown by arrow 1, the first compute unit PEG obtains the first intermediate data row [75]PEG required for padding in the process of performing the second convolution computation from the first computation result group 21 of the second compute unit PE1; as shown by arrow 2, the second compute unit PE1 obtains the second intermediate data row [74]PE1 required for padding in the process of performing the second convolution computation from the first computation result group 11 of the first compute unit PEG; moreover, the first intermediate data row and the second intermediate data row obtained by the first compute unit PEG and the second compute unit PE1 from each other have the same size, and both are 1-row data.

For example, PE1 serves as the first compute unit, PE2 serves as the second compute unit, and as shown by arrow 3, the first compute unit PE1 obtains the first intermediate data row [150]PE1 required for padding in the process of performing the second convolution computation from the first computation result group 31 in the second compute unit PE2; as shown by arrow 4, the second compute unit PE2 obtains the second intermediate data row [149]required for padding in the process of performing the second convolution computation from the first computation result group 21 of the first compute unit PE1; moreover, the first intermediate data row and the second intermediate data row obtained by the first compute unit PE1 and the second compute unit PE2 from each other have the same size, and both are 1-row data.

For example, the first computation result group [0,74] in PEG and the first intermediate data row [75] acquired from PE1 constitute the data group [0,75] PEG required for performing the second convolution computation.

For example, the first computation result group [75,149] in PE1 as well as the second intermediate data row [74] and the first intermediate data row [150] respectively acquired from PEG and PE2 constitute the data group [74,150] required by PE1 for performing the second convolution computation.

For example, the first computation result [150,223] in PE2 and the second intermediate data row [149]acquired from PE2 constitute the data group [149,223]required by PE2 for performing the second convolution computation.

The 3 compute units PE0, PE1, and PE2 perform the second convolution computation on the data groups [0,75], [74,150], and [149,223]after data replication and transmission, to obtain the second computation result groups 12 ([0,74]rows), 22 ([75,149]rows) and 32 ([150,223]rows) as shown on, for example, %10. Finally, step S50 is executed to aggregate the second computation result groups 12 ([0, 74]rows), 22 ([75,149]rows) and 32 ([150,223]rows) in PE0, PE1 and PE2, that is, the computation result of the output layer.

Therefore, the scheduling method provided by at least one embodiment of the present disclosure may reduce the computation complexity of repeated data in the convolutional neural network and improve the computation efficiency of the multi-layer convolutional neural network by replicating and transmitting effective data between the compute units, and taking the effective data as padding rows.

In another example shown in FIG. 6B, in step S20, it may be determined that the 3 compute units PE0, PE1, and PE2 all have the same unidirectional data transmission pattern. In step S30, it is determined that the compute units PE1 and PE2 are the compute units that require data replication and transmission; and it is determined that the number of first intermediate data rows each compute unit requires is two. That is, PE1 acquires two rows of effective data from PEG for padding, and PE2 acquires two rows of effective data from PE1 for padding. For example, as compared with FIG. 6B, in FIG. 6C, it may also be the case where only the compute unit PE1 is the compute unit that requires data replication and transmission. That is, PE1 respectively acquires two rows of effective data from PEG and PE2 for padding. The scheduling method shown in the examples of FIG. 6B and FIG. 6C may not only reduce repeated computations of data and improve computation efficiency, but also reduce the number of times of data transmission between the compute units and reduce the overhead required for data transmission.

For example, the computing apparatus may further include more compute units, and the convolutional network may further include more convolution operators, which will not be limited in the embodiments of the present disclosure. For example, the example shown in FIG. 6D includes four compute units PE0, PE1, PE2, and PE3, which include 3 convolution operators (conv) as follows:

%5: [(1 224 224 64), F, FP32]=conv(%0: [(1 224 224 64), F, FP32], 1%: [(64 3 3 64), W, FP32], kh=3, kw=3, pad_h_top=1, pad_h_bottom=1, pad_w_left=1, pad_w_right=1, stride_h=1, stride_w=1);

%10: [(1 224 224 64), F, FP32]=conv(%5: [(1 224 224 64), F, FP32], 6%: [(64 3 3 64), W, FP32], kh=3, kw=3, pad_h_top=1, pad_h_bottom=1, pad_w_left=1, pad_w_right=1, stride_h=1, stride_w=1);

%15: [(1 224 224 64), F, FP32]=conv(%10: [(1 224 224 64), F, FP32], 11%: [(64 3 3 64), W, FP32], kh=3, kw=3, pad_h_top=1, pad_h_bottom=1, pad_w_left=1, pad_w_right=1, stride_h=1, stride_w=1).

Figure 6D:
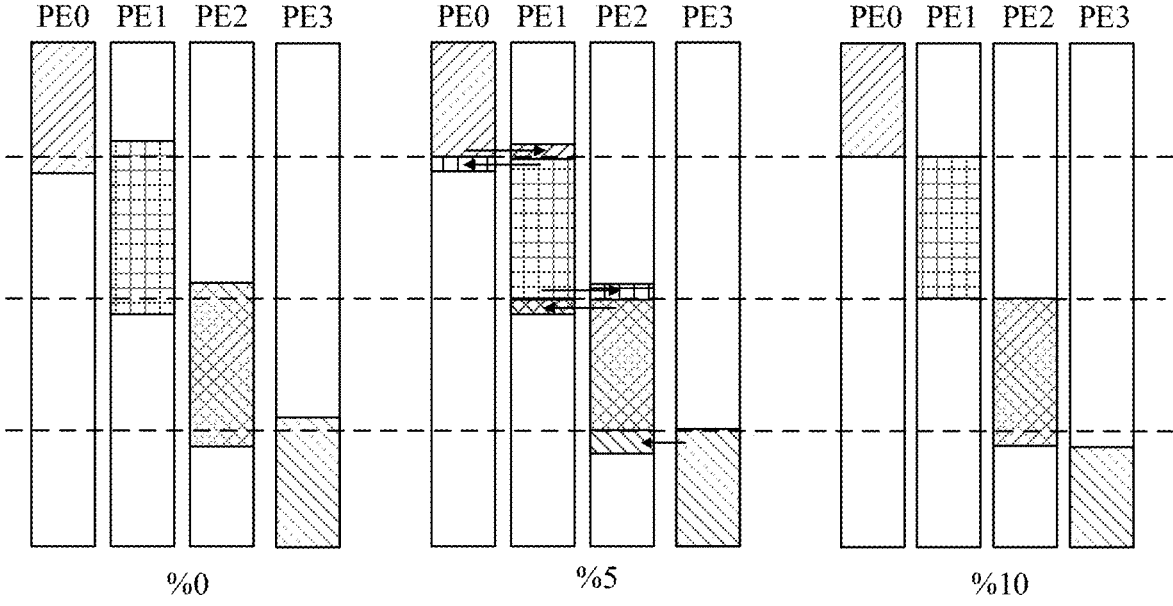

For example, as shown in FIG. 6D, the plurality of compute units PE0, PE1, PE2, and PE3 may have different data replication-transmission modes. For example, a size of a first intermediate data row obtained by each compute unit from another compute unit may be different, which will not be limited in the embodiments of the present disclosure. For example, the number of first intermediate data rows obtained by PE2 from PE1 is 1, while the number of first intermediate data rows obtained by PE2 from PE3 is 2. The description of FIG. 6A may be referred to for the steps of the scheduling method in the example shown in FIG. 6D, and no details will be repeated here. The scheduling method shown in FIG. 6D may not only reduce repeated computations of data and improve computation efficiency, but also implement balanced allocation of memory, computing power, and data transmission overhead between different compute units according to consideration of overall performance of the system.

Figure 7:
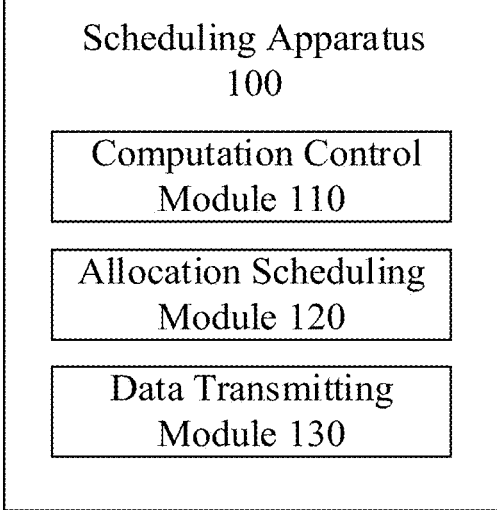
FIG. 7 is a schematic block diagram of a scheduling apparatus provided by at least one embodiment of the present disclosure.

FIG. 7 is a schematic block diagram of a scheduling apparatus provided by some embodiments of the present disclosure. As shown in FIG. 7, the scheduling apparatus 100 includes a computation control module 110, an allocation scheduling module 120, and a data transmitting module 130. These components may be interconnected through buses and/or other forms of connection mechanisms (not shown).

The computation control module 110 is configured to cause a plurality of compute units to respectively perform a first convolution computation on a plurality of data groups that corresponds to the plurality of compute units respectively, to obtain a plurality of first computation result groups, wherein the plurality of first computation result groups are used for constituting a first convolutional layer obtained through the first convolution computation, and the plurality of compute units comprise a first compute unit and a second compute unit.

The allocation scheduling module 120 is configured to determine a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer.

The data transmitting module 130 is configured to cause the first compute unit that is required to perform effective data row padding among the plurality of compute units, to obtain a first intermediate data row required by the first compute unit for padding in the second convolution computation process from a first computation result group in the second compute unit, based on the data replication-transmission mode.

It should be noted that in the embodiment of the present disclosure, the respective modules of the scheduling apparatus 100 correspond to the respective steps of the foregoing scheduling method. The relevant description of the scheduling method above may be referred to for specific functions of the scheduling apparatus 100, and no details will be repeated here. The components and the structures of the scheduling apparatus 100 shown in FIG. 7 are only exemplary, rather than limitative, and the scheduling apparatus 100 may further include other components and structures as needed.

Figure 8:
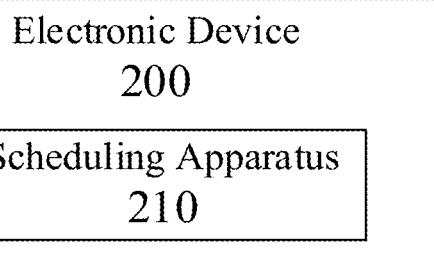
FIG. 8 is a schematic block diagram of an electronic device provided by at least one embodiment of the present disclosure.

FIG. 8 is a schematic block diagram of an electronic device provided by some embodiments of the present disclosure. As shown in FIG. 8, the electronic device 200 includes a scheduling apparatus 210; the scheduling apparatus 210 may be a scheduling apparatus provided by any embodiment of the present disclosure, for example, the foregoing scheduling apparatus 100. The electronic device 200 may be any device having a computing function, for example, a server, a terminal device, a personal computer, etc., which will not be limited in the embodiments of the present disclosure.

Figure 9:
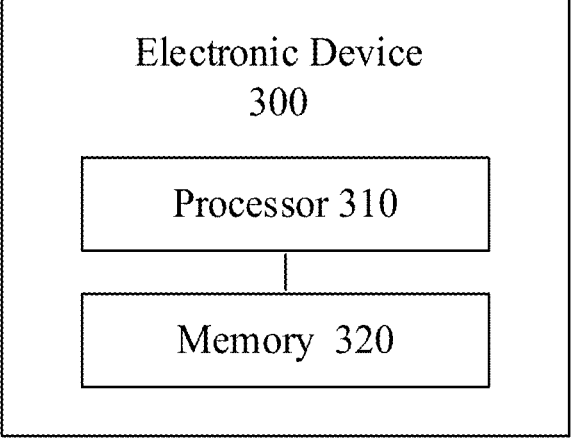
FIG. 9 is a schematic block diagram of another electronic device provided by at least one embodiment of the present disclosure.

FIG. 9 is a schematic block diagram of another electronic device provided by some embodiments of the present disclosure. As shown in FIG. 9, the electronic device 300 includes a processor 310 and a memory 320, which may be configured to implement a client or a server. The memory 320 is configured to store computer-executable instructions (e.g., at least one (one or more) computer program modules) in a non-transitory manner. The processor 310 is configured to run the computer-executable instructions; and the computer-executable instructions, when run by the processor 310, may execute one or more steps in the convolution operation method as described above, and further implement the convolution operation method as described above. The memory 320 and the processor 310 may be interconnected by a bus system and/or other form of connection mechanism (not shown).

For example, the processor 310 may be a central processing unit (CPU), a graphics processing unit (GPU), or other forms of processing unit having a data processing capability and/or a program execution capability. For example, the central processing unit (CPU) may be an X86 or ARM architecture, etc. The processor 310 may be a general-purpose processor or a special-purpose processor, and may control other components in the electronic device 300 to execute desired functions.

For example, the memory 320 may include any combination of at least one (e.g., one or more) computer program products; and the computer program products may include various forms of computer-readable storage media, for example, a volatile memory and/or a non-volatile memory. The volatile memory may include, for example, a random access memory (RAM) and/or a cache, or the like. The non-volatile memory may include, for example, a read-only memory (ROM), a hard disk, an erasable programmable read-only memory (EPROM), a portable compact disk read only memory (CD-ROM), a USB memory, a flash memory, or the like. At least one (e.g., one or more) computer program modules may be stored on the computer-readable storage medium, and the processor 310 may run at least one (e.g., one or more) computer program modules, to implement various functions of the electronic device 300. Various applications and various data, as well as various data used and/or generated by the applications, may also be stored on the computer-readable storage medium.

It should be noted that in the embodiment of the present disclosure, the above description about the scheduling method may be referred to for specific functions and technical effects of the electronic device 300, and no details will be repeated here.

Figure 10:
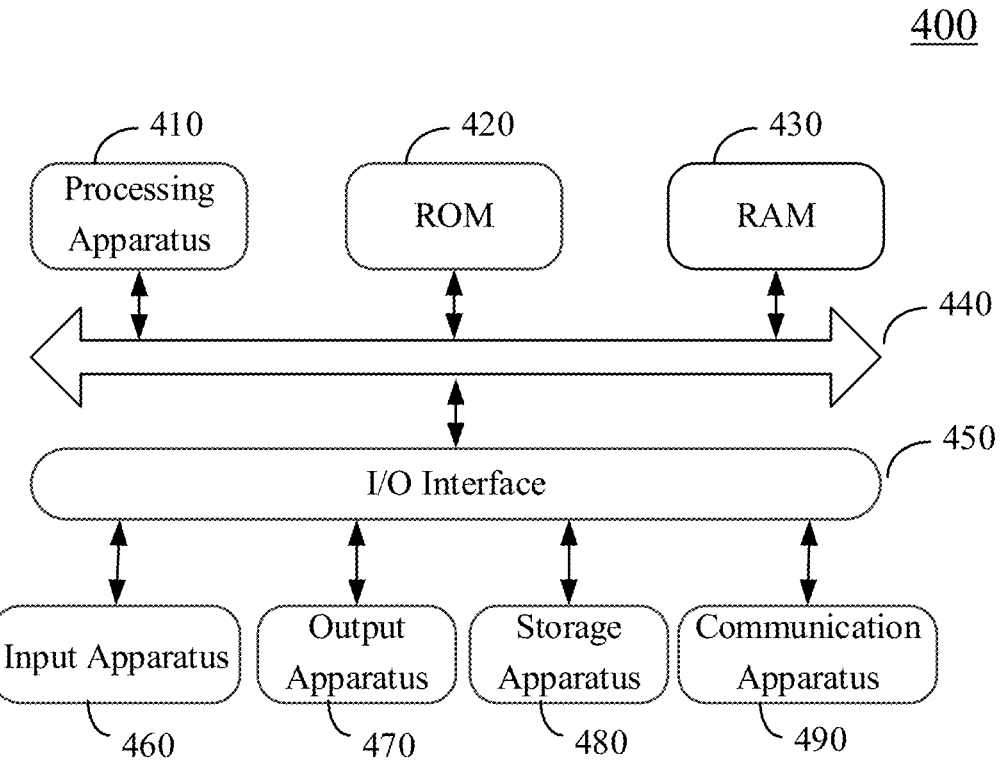
FIG. 10 is a schematic block diagram of another electronic device provided by at least one embodiment of the present disclosure.

FIG. 10 is a schematic block diagram of another electronic device provided by some embodiments of the present disclosure. The electronic device 400 is, for example, suitable for implementing the scheduling method provided by the embodiments of the present disclosure. The electronic device 400 may be a terminal device or the like, which may be configured to implement a client or a server. The electronic device 400 may include but not limited to a mobile terminal such as a mobile phone, a laptop, a digital broadcast receiver, a personal digital assistant (PDA), a portable android device (PAD), a portable multimedia player (PMP), a vehicle-mounted terminal (e.g., a vehicle-mounted navigation terminal), a wearable electronic device, etc., and a stationary terminal such as a digital TV, a desktop computer, a smart home device, etc. It should be noted that the electronic device 400 shown in FIG. 10 is only an example, and will not impose any limitations on the function and scope of use of the embodiments of the present disclosure.

As shown in FIG. 10, the electronic device 400 may include a processing apparatus (e.g., a central processing unit, a graphics processing unit, etc.) 410, which may execute various appropriate actions and processing according to a program stored in a read-only memory (ROM) 420 or a program loaded from a storage device 480 into a random access memory (RAM) 430. The random access memory (RAM) 430 further stores various programs and data required for operation of the electronic device 400. The processing apparatus 410, the ROM 420, and the RAM 430 are connected with each other through a bus 440. An input/output (I/O) interface 450 is also coupled to the bus 440.

Usually, apparatuses below may be coupled to the I/O interface 450: input apparatuses 460 including, for example, a touch screen, a touchpad, a keyboard, a mouse, a camera, a microphone, an accelerometer, a gyroscope, etc.; output apparatuses 470 including, for example, a liquid crystal display (LCD), a speaker, a vibrator, etc.; storage apparatuses 480 including, for example, a magnetic tape or a hard disk, etc.; and a communication apparatus 490. The communication apparatus 490 may allow the electronic device 400 to perform wireless or wired communication with other electronic devices so as to exchange data. Although FIG. 10 shows the electronic device 400 having various apparatuses, it should be understood that, it is not required to implement or have all the apparatuses shown, and the electronic device 400 may alternatively implement or have more or fewer apparatuses.

For example, according to the embodiments of the present disclosure, the above-described scheduling method may be implemented as computer software programs. For example, the embodiments of the present disclosure include a computer program product, including a computer program carried on a non-transitory computer-readable medium, and the computer program including program codes for executing the above-described scheduling method. In such embodiments, the computer program may be downloaded and installed from the network via the communication apparatus 490, or installed from the storage apparatus 480, or installed from the ROM 420. When executed by the processing apparatus 410, the computer program may implement the functions defined in the scheduling method provided by the embodiments of the present disclosure.

At least one embodiment of the present disclosure further provides a storage medium. The storage medium may improve a utilization rate of a matrix operation unit, effectively utilize computing power of the matrix operation unit, shorten time for convolution operation, improve operation efficiency, and save data transmission time.

Figure 11:
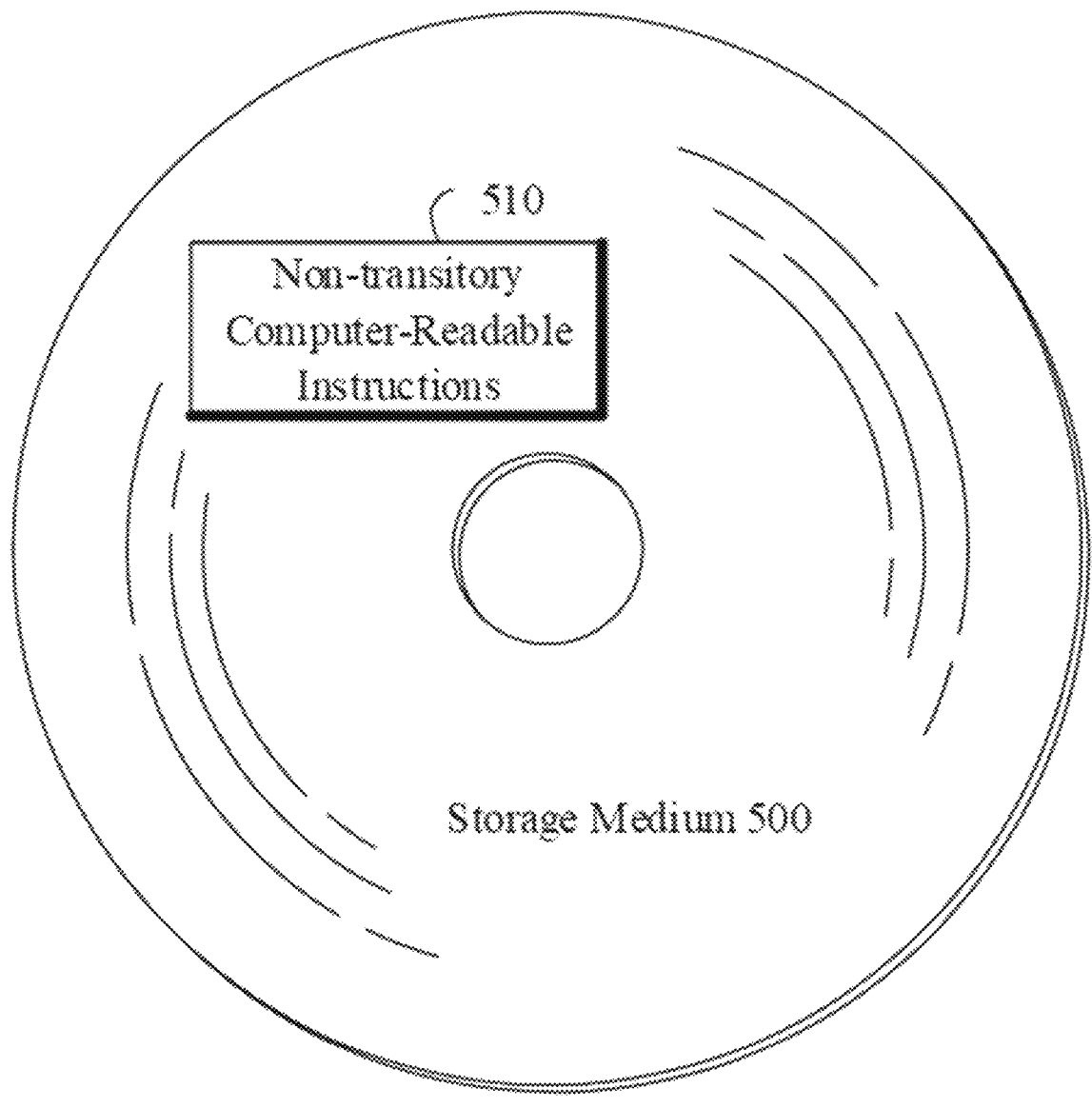
FIG. 11 is a schematic diagram of a storage medium provided by at least one embodiment of the present disclosure.

FIG. 11 is a schematic diagram of a storage medium provided by some embodiments of the present disclosure. For example, as shown in FIG. 11, the storage medium 500 may be a non-transitory computer-readable storage medium having non-transitory computer-readable instructions 510 stored thereon. The non-transitory computer-readable instructions 510, when executed by the processor, may implement the scheduling method according to the embodiments of the present disclosure. For example, the non-transitory computer-readable instructions 510, when executed by the processor, may implement one or more steps according to the scheduling method as described above.

For example, the storage medium 500 may be applied to the above-described electronic device, for example, the storage medium 500 may include the memory 320 in the electronic device 300.

For example, the storage medium may include a memory card of a smart phone, a storage component of a tablet personal computer, a hard disk of a personal computer, a random access memory (RAM), a read-only memory (ROM), an erasable programmable read-only memory (EPROM), a portable compact disc read-only memory (CD-ROM), a flash memory, or any combination of the above-described storage media, or other applicable storage media.

For example, the description of the memory according to the embodiment of the electronic device may be referred to for illustration of the storage medium 500, and no details will be repeated here. The above description about the scheduling method may be referred to for specific functions and technical effects of the storage medium 500, and no details will be repeated here.

In the above text, the scheduling method, the scheduling apparatus, the electronic equipment, and the storage medium provided by the embodiment of the present disclosure are described with reference to FIG. 1 to FIG. 11. According to the scheduling method provided by the embodiment of the present disclosure, the effective data can be copied and transmitted among compute units, and the effective data can be used as a padding line, so that the calculation amount of repeated data in the convolutional neural network can be reduced, and the calculation efficiency of the multi-layer convolutional neural network can be improved.

It should be noted that, in the context of the present disclosure, a computer-readable medium may be a tangible medium, which may include or store programs for use by or in combination with an instruction-executing system, apparatus, or device. The computer-readable medium may be a computer-readable signal medium or a computer-readable storage medium or any combination of the above two. The computer-readable storage medium may be, for example, but not limited to, an electronic, magnetic, optical, electromagnetic, infrared, or semiconductor system, apparatus, or device, or any suitable combination of the above. More specific examples of the computer-readable storage medium may include, but are not limited to: an electrical connection having one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction-executing system, apparatus, or device. Rather, in the present disclosure, the computer-readable signal medium may include a data signal propagated in a baseband or as a portion of a carrier wave, which carries a computer-readable program code therein. Such propagated data signals may take a variety of forms, including but not limited to, electromagnetic signals, optical signals, or any suitable combination of the above. The computer-readable signal medium may also be any computer-readable medium other than a computer-readable storage medium; and the computer-readable signal medium may transmit, propagate, or transport programs for use by or in combination with the instruction executing system, apparatus, or device. The program code embodied on the computer-readable medium may be transmitted by using any suitable medium, including, but not limited to, an electrical wire, an optical cable, a radio frequency (RF), etc., or any suitable combination of the above.

In some implementations, the client and the server may communicate with any network protocol currently known or to be researched and developed in the future such as hypertext transfer protocol (HTTP), and may communicate (e.g., via a communication network) and interconnect with digital data in any form or medium. Examples of communication networks include a local area network ("LAN"), a wide area network ("WAN"), the Internet, and an end-to-end network (e.g., an ad hoc end-to-end network), as well as any network currently known or to be researched and developed in the future.

The above-described computer-readable medium may be included in the above-described electronic device; or may also exist alone without being assembled into the electronic device.

The computer program codes for executing the operations according to the present disclosure may be written in one or more programming languages or a combination thereof; the above-described programming languages include, but are not limited to, object-oriented programming languages such as Java, Smalltalk, C++, and also include conventional procedural programming languages such as "C" language or similar programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network (including a local area network (LAN) or a wide area network (WAN), or the connection may be made to an external computer (e.g., through the Internet using an Internet service provider)).

The flow chart and block diagrams in the accompanying drawings illustrate the architecture, functionality, and operation of possible implementations of systems, methods, and computer program products according to various embodiments of the present disclosure. In this regard, each block in the flow chart or block diagrams may represent a module, a program segment, or a portion of codes, which comprises one or more executable instructions for implementing specified logical function(s). It should also be noted that, in some alternative implementations, the functions noted in the block may occur out of the order noted in the accompanying drawings. For example, two blocks shown in succession may, in fact, be executed substantially concurrently, or the blocks may sometimes be executed in a reverse order, depending upon the functionality involved. It should also be noted that, each block of the block diagrams and/or flow charts, and combinations of blocks in the block diagrams and/or flow charts, may be implemented by special purpose hardware-based systems that execute the specified functions or operations, or may also be implemented by a combination of special purpose hardware and computer instructions.

The units involved in the embodiments of the present disclosure may be implemented by software or hardware. Wherein a name of the unit does not constitute limitation of the unit per se in some cases.

The functions described herein above may be executed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

According to one or more embodiments of the present disclosure, embodiment 1 provides a scheduling method for a multi-layer convolutional neural network, including: respectively performing, by a plurality of compute units, a first convolution computation on a plurality of data groups that corresponds to the plurality of compute units respectively, to obtain a plurality of first computation result groups, wherein the plurality of first computation result groups are used for constituting a first convolutional layer obtained through the first convolution computation, and the plurality of compute units comprise a first compute unit and a second compute unit; determining a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer; and for the first compute unit that is required to perform effective data row padding among the plurality of compute units, obtaining a first intermediate data row required by the first compute unit for padding in the second convolution computation process from a first computation result group in the second compute unit, based on the data replication-transmission mode.

Embodiment 2, the scheduling method according to embodiment 1, wherein data rows in the plurality of first computation result groups are continuous without overlap in the first convolutional layer.

Embodiment 3, the scheduling method according to embodiment 1, wherein a first computation result group in the first compute unit and the first intermediate data row acquired from the second compute unit constitute a data group required by the first compute unit for performing the second convolution computation.

Embodiment 4, the scheduling method according to embodiment 1, wherein the plurality of data groups respectively used in the first convolution computation performed by the plurality of compute units are a plurality of original input data groups.

Embodiment 5, the scheduling method according to embodiment 4, further including:

splitting an original input matrix to obtain the plurality of original input data groups, and respectively transmitting the plurality of original input data groups to the plurality of compute units for performing the first convolution computation.

Embodiment 6, the scheduling method according to embodiment 1, wherein the determining a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer, includes:

determining the configuration rule of the second convolutional layer in the plurality of compute units, based on memory sizes of memories in the plurality of compute units.

determining a distribution situation of the second convolutional layer in the plurality of compute units, based on the configuration rule.

determining the data replication-transmission mode corresponding to the plurality of first computation result group in the plurality of compute units based on the distribution situation.

Embodiment 7, the scheduling method according to embodiment 1, wherein the for the first compute unit that is required to perform effective data row padding among the plurality of compute units, obtaining a first intermediate data row required by the first compute unit for padding in the second convolution computation process from a first computation result group in the second compute unit, based on the data replication-transmission mode, comprises:

determining a size of the first intermediate data row based on a relationship between a second computation result group and a first computation result group, wherein the second computation result group is a computation result obtained after the second convolution computation by the first compute unit, the first computation result group is a computation result obtained after the first convolution computation by the first compute unit.

obtaining the first intermediate data row from the first computation result group in the second compute unit, based on the data replication-transmission mode and the size of the first intermediate data row.

Embodiment 8, the scheduling method according to embodiment 7, wherein a size of the second computation result group to be obtained by the first compute unit is a same as a size of the first computation result group in the first compute unit.

Embodiment 9, the scheduling method according to embodiment 7, further including:

aggregating a plurality of second computation result groups in the plurality of compute units to obtain at least a portion of computation output of the multi-layer convolutional neural network, in response to the second convolutional layer being an output layer in the multi-layer convolutional neural network.

Embodiment 10, the scheduling method according to any one of embodiments 1-9, further including:

obtaining, by the second compute unit, a second intermediate data row required by the second compute unit for padding in the second convolution computation process from a first computation result group in the first compute unit, based on the data replication-transmission mode.

Embodiment 11, the scheduling method according to embodiment 10, wherein the first intermediate data row obtained from the second compute unit and the second intermediate data row obtained from the first compute unit have a same size.

According to one or more embodiments of the present disclosure, embodiment 12 provides a scheduling apparatus for a multi-layer convolutional neural network, including:

a computation control module, configured to cause a plurality of compute units to respectively perform a first convolution computation on a plurality of data groups that corresponds to the plurality of compute units respectively, to obtain a plurality of first computation result groups, wherein the plurality of first computation result groups are used for constituting a first convolutional layer obtained through the first convolution computation, and the plurality of compute units comprise a first compute unit and a second compute unit.

an allocation scheduling module, configured to determine a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer.

a data transmitting module, configured to cause the first compute unit that is required to perform effective data row padding among the plurality of compute units, to obtain a first intermediate data row required by the first compute unit for padding in the second convolution computation process from a first computation result group in the second compute unit, based on the data replication-transmission mode.

Embodiment 13, the scheduling apparatus according to embodiment 12, wherein data rows in the plurality of first computation result groups are continuous without overlap in the first convolutional layer.

Embodiment 14, the scheduling apparatus according to embodiment 12, wherein a first computation result group in the first compute unit and the first intermediate data row acquired from the second compute unit constitute a data group required by the first compute unit for performing the second convolution computation.

Embodiment 15, the scheduling apparatus according to embodiment 12, wherein the plurality of data groups respectively used in the first convolution computation performed by the plurality of compute units are a plurality of original input data groups.

Embodiment 16, the scheduling apparatus according to embodiment 15, further including:

a data splitting module, configured to split an original input matrix to obtain the plurality of original input data groups, and respectively transmit the plurality of original input data groups to the plurality of compute units for performing the first convolution computation.

Embodiment 17, the scheduling apparatus according to embodiment 12, wherein the determining a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer, includes:

determining the configuration rule of the second convolutional layer in the plurality of compute units, based on memory sizes of memories in the plurality of compute units.

determining a distribution situation of the second convolutional layer in the plurality of compute units, based on the configuration rule.

determining the data replication-transmission mode corresponding to the plurality of first computation result group in the plurality of compute units based on the distribution situation.

Embodiment 18, the scheduling apparatus according to embodiment 12, wherein the for the first compute unit that is required to perform effective data row padding among the plurality of compute units, obtaining a first intermediate data row required by the first compute unit for padding in the second convolution computation process from a first computation result group in the second compute unit, based on the data replication-transmission mode, comprises:

determining a size of the first intermediate data row based on a relationship between a second computation result group and a first computation result group, wherein the second computation result group is a computation result obtained after the second convolution computation by the first compute unit, the first computation result group is a computation result obtained after the first convolution computation by the first compute unit.

obtaining the first intermediate data row from the first computation result group in the second compute unit, based on the data replication-transmission mode and the size of the first intermediate data row.

Embodiment 19, the scheduling apparatus according to embodiment 18, wherein a size of the second computation result group to be obtained by the first compute unit is a same as a size of the first computation result group in the first compute unit.

Embodiment 20, the scheduling apparatus according to embodiment 18, further including:

a data output module, configured to aggregate a plurality of second computation result groups in the plurality of compute units to obtain at least a portion of computation output of the multi-layer convolutional neural network, in response to the second convolutional layer being an output layer in the multi-layer convolutional neural network.

Embodiment 21, the scheduling apparatus according to any one of embodiments 12-20, the data output module is further configured to:

make the second compute unit obtain a second intermediate data row required by the second compute unit for padding in the second convolution computation process from a first computation result group in the first compute unit, based on the data replication-transmission mode.

Embodiment 22, the scheduling apparatus according to embodiment 21, wherein the first intermediate data row obtained from the second compute unit and the second intermediate data row obtained from the first compute unit have a same size.

According to one or more embodiments of the present disclosure, embodiment 23 provides an electronic device, which includes the scheduling apparatus according to any one of embodiments 12-22.

According to one or more embodiments of the present disclosure, embodiment 24 provides an electronic device, which includes: a processor; and a memory, comprising at least one computer program module; wherein the at least one computer program module is stored in the memory and is configured to be executed by the processor, and the at least one computer program module is configured to implement the scheduling method according to any one of embodiments 1 to 11.

According to one or more embodiments of the present disclosure, embodiment 25 provides a storage medium, having non-transitory computer-readable instructions stored thereon; wherein the non-transitory computer-readable instructions, when executed by a computer, implement the scheduling method according to any one of embodiments 1 to 11.

Although the present disclosure has been described in detail with general description and specific implementations, it is obvious to those skilled in the art that some modifications or improvements may be made on the basis of the embodiments of the present disclosure. Therefore, these modifications and improvements made without departing from the spirit of the present disclosure all fall within the protection scope of the present disclosure.

With respect to the present disclosure, several points below need to be explained:

(1) The drawings of the embodiments of the present disclosure relate only to the structures involved in the embodiments of the present disclosure, and normal designs may be referred to for other structures.

(2) For the sake of clarity, in the drawings used for describing the embodiments of the present disclosure, thicknesses of layers or regions are enlarged or reduced, that is, these drawings are not drawn in an actual scale.

(3) In case of no conflict, the embodiments of the present disclosure and the features in the embodiments may be combined with each other to obtain a new embodiment.

The above are only specific embodiments of the present disclosure, but the scope of the present disclosure is not limited thereto, and the scope of the present disclosure should be the scope of the following claims.

The invention claimed is:

1. A scheduling method for a multi-layer convolutional neural network, comprising:

respectively performing, by a plurality of compute units, a first convolution computation on a plurality of data groups that correspond to the plurality of compute units respectively, to obtain a plurality of first computation result groups, wherein a first convolutional layer obtained through the first convolution computation comprises the plurality of first computation result groups, and the plurality of compute units comprise a first compute unit and a second compute unit;

determining a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer; and copying a first intermediate data row required by the first compute unit for padding in the second convolution computation process from a first computation result group in the second compute unit and transmitting the first intermediate data row that is copied to the first compute unit based on the data replication-transmission mode by:

determining a size of the first intermediate data row based on a relationship between a second computation result group and a first computation result group in the first compute unit, wherein the second computation result group is a computation result obtained after the second convolution computation by the first compute unit, the first computation result group in the first compute unit is a computation result obtained after the first convolution computation by the first compute unit; and copying the first intermediate data row from the first computation result group in the second compute unit and transmitting the first intermediate data row that is copied to the first compute unit based on the data replication-transmission mode and the size of the first intermediate data row.

2. The scheduling method according to claim 1, wherein data rows in the plurality of first computation result groups are continuous without overlap in the first convolutional layer.

3. The scheduling method according to claim 1, wherein the first computation result group in the first compute unit and the first intermediate data row acquired from the second compute unit constitute a data group required by the first compute unit for performing the second convolution computation.

4. The scheduling method according to claim 1, wherein the plurality of data groups respectively used in the first convolution computation performed by the plurality of compute units are a plurality of original input data groups.

5. The scheduling method according to claim 4, further comprising:

splitting an original input matrix to obtain the plurality of original input data groups, and respectively transmitting the plurality of original input data groups to the plurality of compute units for performing the first convolution computation.

6. The scheduling method according to claim 1, wherein the determining the data replication-transmission mode corresponding to the plurality of first computation result groups in the plurality of compute units, according to the configuration rule of the second convolutional layer in the plurality of compute units, comprises:

determining the configuration rule of the second convolutional layer in the plurality of compute units, based on memory sizes of memories in the plurality of compute units;

determining a distribution of the second convolutional layer in the plurality of compute units, based on the configuration rule; and determining the data replication-transmission mode corresponding to the plurality of first computation result groups in the plurality of compute units based on the distribution.

7. The scheduling method according to claim 1, wherein a size of the second computation result group to be obtained by the first compute unit is a same as a size of the first computation result group in the first compute unit.

8. The scheduling method according to claim 1, further comprising:

aggregating a plurality of second computation result groups in the plurality of compute units to obtain at least a portion of computation output of the multi-layer convolutional neural network, in response to the second convolutional layer being an output layer in the multi-layer convolutional neural network.

9. The scheduling method according to claim 1, further comprising:

obtaining, by the second compute unit, a second intermediate data row required by the second compute unit for padding in the second convolution computation process from the first computation result group in the first compute unit, based on the data replication-transmission mode.

10. The scheduling method according to claim 9, wherein the first intermediate data row obtained from the second compute unit and the second intermediate data row obtained from the first compute unit have a same size.

11. A storage medium, having non-transitory computer-readable instructions stored thereon; wherein the non-transitory computer-readable instructions, when executed by a computer, implement the scheduling method according to claim 1.

12. An electronic device, comprising:

a processor; and a memory, comprising at least one computer program module;

wherein the at least one computer program module is stored in the memory and is configured to be executed by the processor, and the at least one computer program module is configured to implement a scheduling method, wherein the scheduling method comprises:

respectively performing, by a plurality of compute units, a first convolution computation on a plurality of data groups that correspond to the plurality of compute units respectively, to obtain a plurality of first computation result groups, wherein a first convolutional layer obtained through the first convolution computation comprises the plurality of first computation result groups, and the plurality of compute units comprise a first compute unit and a second compute unit;

determining a data replication-transmission mode corresponding to the plurality of first computation result groups in the plurality of compute units, according to a configuration rule of a second convolutional layer in the plurality of compute units, wherein the second convolutional layer is obtained after performing, by the plurality of compute units, a second convolution computation on the first convolutional layer;

copying a first intermediate data row required by the first compute unit for padding in the second convolution computation process from a first computation result group in the second compute unit and transmitting the first intermediate data row that is copied to the first compute unit based on the data replication-transmission mode by:

determining a size of the first intermediate data row based on a relationship between a second computation result group and a first computation result group in the first compute unit, wherein the second computation result group is a computation result obtained after the second convolution computation by the first compute unit, the first computation result group in the first compute unit is a computation result obtained after the first convolution computation by the first compute unit; and copying the first intermediate data row from the first computation result group in the second compute unit and transmitting the first intermediate data row that is copied to the first compute unit based on the data replication-transmission mode and the size of the first intermediate data row.

13. The electronic device according to claim 12, wherein data rows in the plurality of first computation result groups are continuous without overlap in the first convolutional layer.

14. The electronic device according to claim 12, wherein the first computation result group in the first compute unit and the first intermediate data row acquired from the second compute unit constitute a data group required by the first compute unit for performing the second convolution computation.

15. The electronic device according to claim 12, wherein the plurality of data groups respectively used in the first convolution computation performed by the plurality of compute units are a plurality of original input data groups.

16. The electronic device according to claim 12, wherein the at least one computer program module is further configured to cause the electronic device to:

determine the configuration rule of the second convolutional layer in the plurality of compute units, based on memory sizes of memories in the plurality of compute units; determine a distribution of the second convolutional layer in the plurality of compute units, based on the configuration rule; and determine the data replication-transmission mode corresponding to the plurality of first computation result groups in the plurality of compute units based on the distribution.

* * * * *